W. T. HAEN.
BAND BRAKE.
APPLICATION FILED SEPT. 15, 1915.
1,214,778.
Patented Feb. 6, 1917.
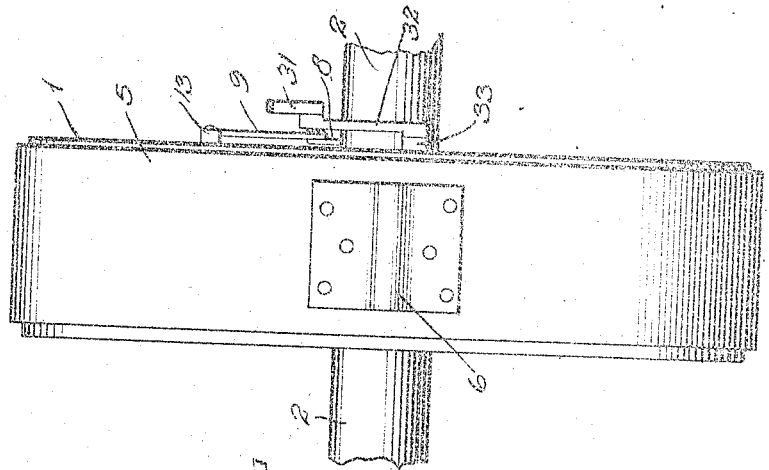
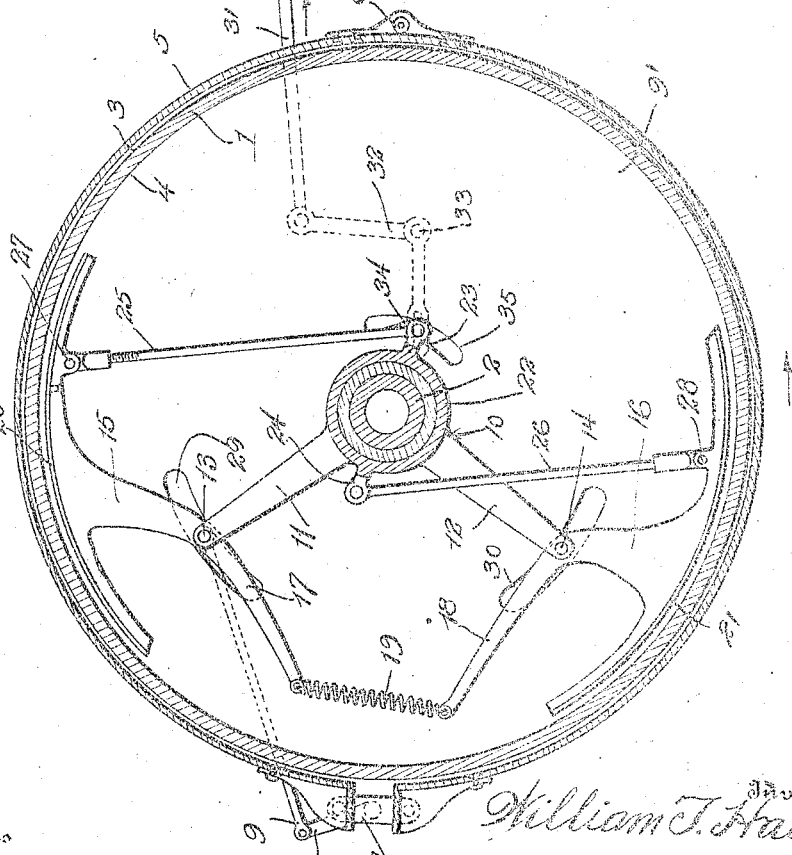

UNITED STATES PATENT OFFICE.

WILLIAM T. HAEN, OF MANTADOR, NORTH DAKOTA.

BAND-BRAKE.

1,214,778. Specification of Letters Patent. Patented Feb. 6, 1917.

Application filed September 15, 1915. Serial No. 50,882.

*To all whom it may concern:*

Be it known that I, WILLIAM T. HAEN, a citizen of the United States, residing at Mantador, in the county of Richland and State of North Dakota, have invented certain new and useful Improvements in Band-Brakes, of which the following is a specification.

My invention relates to improvements in brakes and more particularly to that class of brakes known as band brakes.

The primary object of my invention is to combine with the ordinary form of band brake exteriorly mounted on a drum, a new and improved shoe brake for engagement simultaneously with the band brake upon the interior peripheral face of said drum.

Another object of my invention is to provide means for establishing connection between said band and the shoe brakes to insure simultaneous application of said brakes.

With the above and other objects in view my invention resides preferably in the construction, combination, and arrangement of parts as hereinafter set forth in the specification as illustrated in the accompanying drawing, in which—

Figure 1 is a vertical sectional view through a brake and drum showing my improvements in brakes associated therewith, and Fig. 2 is a side elevational view of the brake.

Similar reference characters designate similar parts throughout the various views of the drawing.

In the drawing, wherein the preferred embodiment of my invention is illustrated, I have shown a brake drum 1 carrying on and rotatable with the usual axle or shaft 2.
The brake drum is provided with two braking surfaces designated 3 and 4, said braking surfaces being termed hereinafter as the exterior and interior braking surfaces, respectively. The usual band brake is shown and designated 5, said band being anchored at 6 and circumferentially located relative to said drum to act upon the exterior braking surface thereof. The opposite extremities of the band 5 are connected by a link 7, said link having permanent connection and adapted for simultaneous movement with a lever 8, one extremity thereof having connection with a connecting rod 9 for purposes which will hereinafter appear. The drum 1 is provided with the usual side wall 9'.

My improvement in brakes is preferably disposed within the drum for engagement with the interior braking surface and comprises a spider casting 10 having a pair of radiating arms 11 and 12 formed therewith. The casting 10 is hereby rotatable on the axle 2, the free extremities of said arms 11 and 12 having pivotal connection as indicated at 13 and 14 with brake shoes 15 and 16, respectively. The brake shoes 15 and 16 are substantially identical in construction and a peculiar shape as will be clearly seen from an inspection of Fig. 1. Said brake shoes are provided with curved inwardly extending arms 17 and 18, respectively, said arms being connected intermediate their lengths to the arms 11 as hereinbefore referred to and as shown at the points 13 and 14. The free extremities of said arms 17 and 18 are yieldably connected by means of a spring or the like 19 for a purpose which will hereinafter appear. The braking surfaces of the shoes 15 and 16 may be of any suitable friction material such as leather or the like and are designated 20 and 21, respectively. The connecting rod 9 at the extremity opposite that at which it is connected to the lever 8 has pivotal connection with the brake shoe 15 on the connecting pin 13 thereof for the purpose which will hereinafter appear.

A sleeve 22 is freely rotatable on the shaft or axle 2 independently of the spider casting 12 and is provided with a plurality of radiating extending ears 23 and 24, said ears being connected, respectively, by means of rods 25 and 26 to the brake shoes 15 and 16 at the points 27 and 28. All of said connections are pivotal as clearly shown in Fig. 1.

In order to allow connection of the arm 11 with the connecting rod 8 and to afford guiding means for the brake shoes 15 and 16, I have provided arcuate slots 29 and 30 in the wall 9', the points 13 and 14 being adapted to extend into said slots and carry some anti-friction means such as a roller or the like, (not shown). As shown to advantage in Fig. 1, rods 25 and 26 are preferably adjustably connected to the shoes for an obvious purpose, and in order to rotate said sleeve 22 to cause an application of the brake, I have provided an actuating rod 31 having connection with one of the ears, viz., 23 through the medium of a bellcrank lever 32 pivoted at 33 and having connection at 34 to said ear 23. In order to allow free movements of the connection 34, an arcuate slot 35 has been provided in the wall 9'.

It will be noted that the shoes 15 and 16 are provided with relatively large brake surfaces so as to insure a maximum braking action.

In operation to apply the brake, a pull is directed on the actuating rod 31 in the direction of the arrow. This will cause the sleeve 22 to be rotated through the arc of a circle. This will impart outward movement to the shoes on the pivots 13 and 14 through the medium of the connecting rods 25 and 26 causing the shoes to engage the interior surface of a drum. This movement will cause the brake shoes to move from their original normal position slightly about the drum 1 owing to their frictional engagement therewith. This movement will simultaneously cause the movement of the connecting rod 9 turning the link 7 through the medium of the lever 8, bringing the band 5 into braking engagement with the exterior surfaces of said drum. The spring 19 assists the rods 25 and 26 in performing their function.

From the above description taken in connection with the accompanying drawing, it is thought that a clear and comprehensive understanding of the construction, operation and advantages of my invention may be readily gathered and while I have shown and described the same as embodying a specific structure, I reserve the right to make changes therein which do not depart from the spirit and scope of the invention as claimed.

I claim:

1. A brake, including a drum, mounted on an axle, exterior braking means for said drum, a spider having radiating arms freely rotatable on said axle, brake shoes carried by the free extremities of said arms, yieldable connecting means for said brake shoes, means connecting said brake shoes with said exterior braking means, guide means therefor, a sleeve on said axle and independently rotatable of said spider and said shaft having connection with an actuating rod, and means connecting said sleeve with said brake shoes to force the latter into braking position.

2. A brake, including a drum mounted on an axle, exterior braking means for said drum, a spider having radiating arms freely rotatable on said axle, brake shoes carried by the free extremities of said arms, means connecting said brake shoes with said exterior braking means, guide means therefor, a sleeve on said axle and independently rotatable of said spider and said axle having connection with a manually operable actuating rod, arms pivotally connected with said sleeve and said brake shoes to force the latter into braking position, and spring means for assisting said brake shoes in moving into braking position.

In testimony whereof I affix my signature in presence of two witnesses.

WILLIAM T. HAEN.

Witnesses:
J. R. DVORAK,
A. J. LIEN.